UNITED STATES PATENT OFFICE.

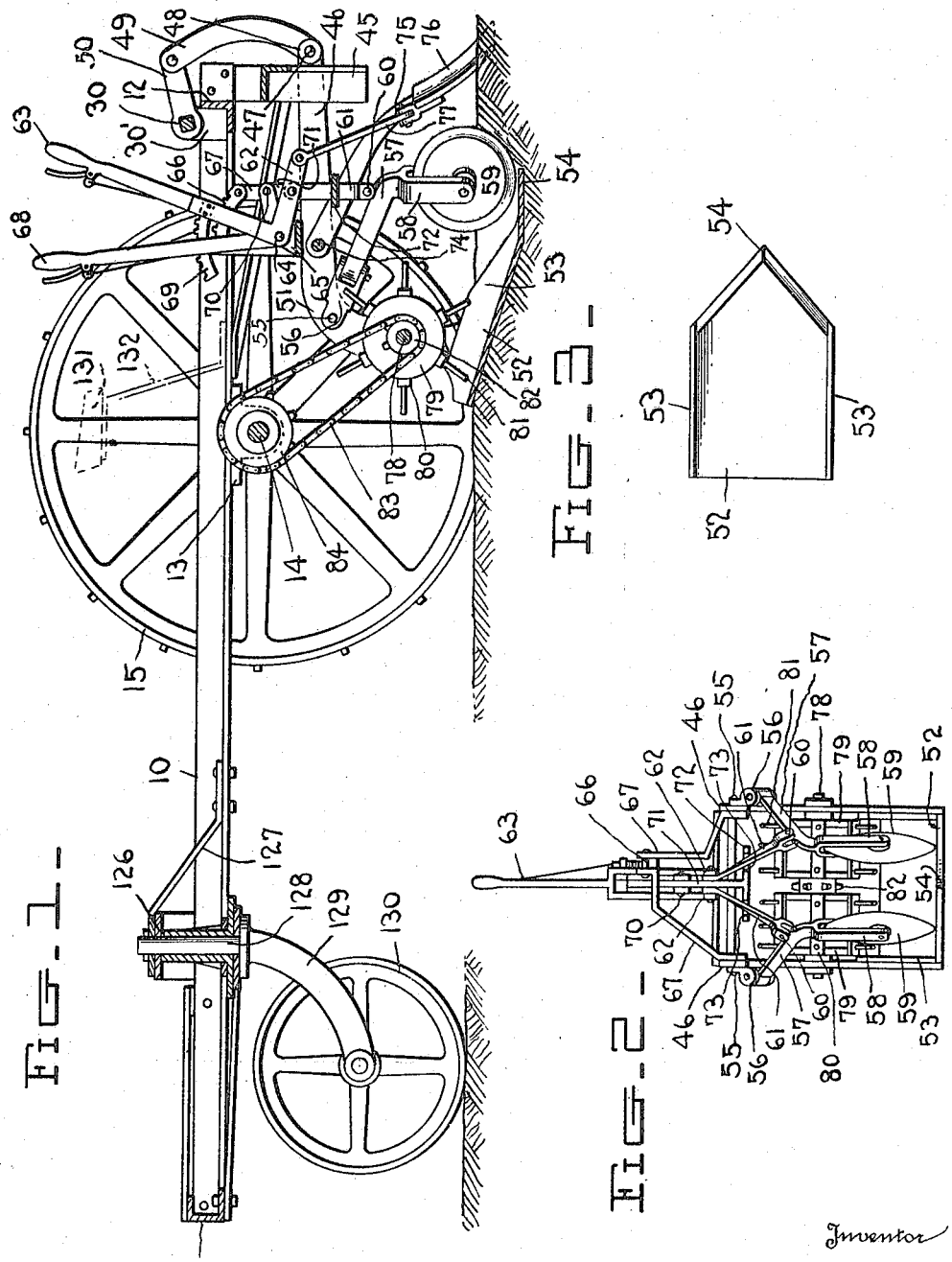

GUY M. HATFIELD, OF FORT SMITH, ARKANSAS.

POTATO-HARVESTER.

1,221,729.　　　　Specification of Letters Patent.　　　Patented Apr. 3, 1917.

Application filed August 18, 1913. Serial No. 785,303.

*To all whom it may concern:*

Be it known that I, GUY M. HATFIELD, a citizen of the United States, residing at Fort Smith, in the county of Sebastian and State of Arkansas, have invented certain new and useful Improvements in Potato-Harvesters, of which the following is a specification.

This invention has relation to potato harvesters and has for its object to provide a simple and durable machine of the character indicated including the following instrumentalities.

Another object of the invention is to provide in such a machine, means for removing the vines and a thin layer of the top soil as the machine is drawn along a row of potatoes. Means are provided for adjusting the said vine remover vertically so that it may operate at any desired depth in the soil or may be positioned above the surface of the soil.

Another object of the invention is to provide in a machine as indicated means for removing the soil from the row of potatoes in the ground at the opposite sides thereof. These means are vertically adjustable in order that they may remove more or less soil as desired or may be lifted entirely above the surface of the soil so that the machine may be readily transported from place to place.

Another object of the invention is to provide a vertically adjustable digging share. This share is adapted to move under the potatoes and lift them out of the soil.

With these and other objects in view, the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification, and in which like numerals of reference indicate similar parts in the several views:—

Figure 1 shows an elevational view with parts in section of a potato harvester embodying my invention.

Fig. 2 is a front elevation of the lower forward portion of the harvester.

Fig. 3 is a plan view of the share of the harvester.

In carrying out the aim of my invention I employ a frame comprising the side bars 10, the rear bar 11, and the front bar 12, these bars being preferably cut from angle iron. Secured to the side bars 10, are the bearings 13, these bearings being mounted upon intermediate portions of the side bars 10 and give revoluble support to an axle 14 to which are secured suitable ground wheels 15, which are fixed to the axle 14 so that said axle rotates with said wheels. Guides 45 depend from the forward cross bar 12 of the frame and lifting bars 46 are movably mounted between said guides. The bars 46 are connected at their forward ends with a shaft 47, and are located between the collars 48 mounted upon said shaft. Links 49 are connected at their lower ends with the shaft 47 and at their upper ends with the stub arms 40 which are fixed to a shaft 30, this shaft 30 being held within the bearings 30' secured to the side bars 10, as shown in Fig. 1. The lifting bars 46 are provided at their rear ends with the down-turned portions 51 to which are secured a digging share 52 shown in top view in Fig. 3. This share is provided with the vertically disposed side portions 53 which are attached directly to the portions 51 of the bars 46, the share ending in the forwardly directed point 54. At points 55 knuckles 56 are pivoted to the sides of the lifting bars 46. These knuckles are free to swing vertically on their pivotal connections with the said lifting bars. Carrying arms 57 are pivoted at their rear ends to the knuckles 56 and are arranged to swing approximately horizontally. The carrying arms 57 at their forward ends are bifurcated to provide spaced side portions 58 between which are journaled the soil casting disks 59.

Divergently held connecting bars 61 are pivoted as at 60 at their forward ends to the intermediate portions of the carrying arms 57. These connecting bars extend upwardly and are pivotally connected at their upper ends with an end 62 of a lever 63 which is fulcrumed on the stud 64 to an ear 65 mounted upon the lifting arms 46. A segment 66 is mounted upon an arm 67 carried by the lifting arms 46 and is adapted to be engaged by a pawl carried by the lever 63. Therefore, it will be seen that as the lever 63 is swung, the connecting bars 61 are moved vertically and thus the forward ends of the arms 57 are raised or lowered and the soil casting disks 59 are correspondingly raised or lowered. The disks 59 are located adjacent to the side edges of the pointed portion 54 of the share 52. A lever 68 is also fulcrumed on the stud 64 secured to the ears 65 and is provided with a pawl which engages a segment 69 fixed to the lever 63. The lower end of the lever 68 is pivoted as at 70 to the upper end of a link 71 which is provided at its lower end with a crosshead 72 having openings 73 which receive the intermediate portions of the connecting bars 61. Therefore it will be seen that when the lever 68 is swung the link 71 is moved vertically as is also the crosshead 72, and thus the lower ends of the bars 61 are spread apart or brought together and consequently the disks 59 are spread apart or brought together. A shaft 74 is carried by the lifting bars 46 and the rear ends of blade arms 75 are pivoted upon the said shaft 74. A blade 76 is mounted upon the forward ends of the arms 75. This blade is so positioned that its long dimension is disposed at an angle to the line of draft of the machine and the forward portion of the blade 76 is downwardly inclined. This blade is adapted to engage the vines and the top soil of the ground and remove the same in advance of the disks 59. The disposition of the blade 76 is such that the material which it encounters is cast toward one side of the machine as the machine passes along a row of potatoes. A link 77 is pivotally connected thereto and at its upper end is pivoted to the end 62 of the lever 63. Consequently when the lever 63 is swung, the blade 76 is raised or lowered. Therefore as the disks 59 are raised or lowered the blade 76 is also raised or lowered. A shaft 78 is journaled at its ends in the portions 51 of the lifting bars 46 and heads 79 are mounted upon the said shaft 78. These heads are connected together by slats 80, which are disposed at angles to the line of draft of the machine as above illustrated in Fig. 3 of the drawing. Radially disposed fingers 81 are mounted upon the slats 80. A sprocket wheel 82 is fixed to the intermediate portion of the shaft 78. A sprocket wheel 84 is fixed to the intermediate portion of the axle 14 and a sprocket chain 83 passes around the sprocket wheels 84 and 82 and is adapted to transmit rotary movement from the axle 14 to the shaft 78. Therefore, as the machine moves along a row of potatoes the vines are cast aside by the blade 76, the soil at the opposite sides of the row of potatoes is removed by the disks 59 and the pointed end 54 of the share 52 passes under the potatoes. The potatoes move up along the share 52 between the sides 53 and are encountered by the fingers 81, which cast them upwardly and rearwardly into an elevator trunk, not shown, and a bearing 126 is located at the rear part of the frame of the machine and the brace 127 is connected with the upper portion of the said bearing. A spindle 128 is freely journaled in the bearing 126 and carries at its lower end a frame 129. A caster wheel 130 is journaled in the frame 129 and supports the rear part of the frame of the machine. A seat 131 is mounted upon supports 132 which in turn are mounted upon the side bars 10 of the frame.

Therefore it will be seen that a simple and effective machine is provided for removing the vines from the row of potatoes, removing the soil at the opposite sides of the row of potatoes, and digging the potatoes. The parts are relatively adjustable and may be positioned to meet conditions according to the nature of the soil or the inclination of the surface of the ground.

Having described the invention, what is claimed is:—

1. A potato harvester comprising a wheel mounted frame, a share carried by the frame, soil casting disks located at the sides of the share, means for raising and lowering the disks and means for moving the disks toward or away from each other.

2. A potato harvester comprising a wheel mounted frame, a share carried by the frame, disks connected to the share and located at the opposite sides thereof, means for raising and lowering the disks with relation to the share and means for moving the disks laterally toward or away from the share.

3. A potato harvester comprising a wheel mounted frame, a share carried by the frame, arms pivotally connected with the share, disks carried by the arms and located at the opposite sides of the share, a lever fulcrumed upon the share, bars pivotally connected with the lever and pivotally connected with the arms, another lever fulcrumed upon the share, a link connected with the last mentioned lever and having a bar provided with openings which receive the first mentioned bars.

4. In combination a wheel supported frame, guides depending from said frame, lifting bars movably mounted between said guides, a shaft connected to said lifting bars, links secured at one end to said shaft, a rock shaft, stub arms extending from said rock shaft said links secured to said stub arms, and a digging share secured to said lifting arms.

5. In combination a wheel supported frame, guides depending from said frame, lifting bars movably mounted between said guides, a shaft connected to said lifting bars, links secured at one end to said shaft, a rock shaft, stub arms extending from said rock shaft said links secured to said stub arms, a digging share secured to said lifting bars, knuckles secured to said lifting bars, carrying arms secured to said knuckles, and soil casting disks secured to said carrying arms.

6. In combination a wheel supported frame, guides depending from said frame, lifting bars movably mounted between said guides, a shaft connected to said lifting bars, links secured at one end to said shaft, a rock shaft, stub arms extending from said rock shaft said links secured to said stub arms, knuckles secured to said lifting bars, carrying arms secured to said knuckles, soil casting disks secured to said carrying arms, connecting bars secured to said carrying arms, and a lever secured to said lifting bars said carrying arms secured to said lever.

In testimony whereof I affix my signature, in the presence of two witnesses.

GUY M. HATFIELD.

Witnesses:
 FOUNTAIN EDWARDS,
 JAMES A. PLUNKETT.

Copies of this patent may be obtained for five cents each, by addressing the "Commissioner of Patents, Washington, D. C."